(12) United States Patent
Chen et al.

(10) Patent No.: US 12,373,386 B1
(45) Date of Patent: Jul. 29, 2025

(54) ELECTRONIC FILE PARSING AND GENERATION SYSTEM AND METHOD

(71) Applicant: AIP Technology Corporation, Grand Cayman (KY)

(72) Inventors: Tung-Yang Chen, ZhuBei (TW); Chu Hsu, Zhubei (TW)

(73) Assignee: AIP TECHNOLOGY CORPORATION, Grand Cayman (KY)

( * ) Notice: Subject to any disclaimer, the term of this patent is extended or adjusted under 35 U.S.C. 154(b) by 0 days.

(21) Appl. No.: 18/595,595

(22) Filed: Mar. 5, 2024

(30) Foreign Application Priority Data

Jan. 11, 2024 (TW) .................................. 113101217

(51) Int. Cl.
*G06F 16/11* (2019.01)
*G06F 16/16* (2019.01)

(52) U.S. Cl.
CPC ............ *G06F 16/116* (2019.01); *G06F 16/16* (2019.01)

(58) Field of Classification Search
CPC ............................... G06F 16/116; G06F 16/16
See application file for complete search history.

(56) References Cited

U.S. PATENT DOCUMENTS

| | | | |
|---|---|---|---|
| 8,104,000 B2 | 1/2012 | Bjesse | |
| 8,707,252 B1 * | 4/2014 | Alexeev | G06F 8/427 717/136 |
| 10,484,419 B1 * | 11/2019 | Davis | G06F 21/564 |
| 11,250,130 B2 * | 2/2022 | Shi | G06F 21/565 |
| 2007/0112714 A1 * | 5/2007 | Fairweather | G06F 8/427 706/46 |
| 2009/0307640 A1 * | 12/2009 | Chapman | G06F 30/3323 716/136 |
| 2016/0092181 A1 * | 3/2016 | Rodgers | G06F 8/447 717/145 |
| 2018/0210995 A1 * | 7/2018 | Patra | G06F 30/398 |
| 2021/0103553 A1 * | 4/2021 | Babet | G06F 12/0891 |
| 2022/0358162 A1 | 11/2022 | Venugopala Reddy et al. | |

FOREIGN PATENT DOCUMENTS

| | | | | |
|---|---|---|---|---|
| CN | 101676919 B | | 3/2013 | |
| JP | 2004192609 A | * | 7/2004 | ............ G06F 12/00 |
| TW | 201142638 A1 | | 12/2011 | |
| TW | I470461 B | | 1/2015 | |
| TW | 202018549 A | | 5/2020 | |

* cited by examiner

*Primary Examiner* — Angelica Ruiz
(74) *Attorney, Agent, or Firm* — Birch, Stewart, Kolasch & Birch, LLP

(57) ABSTRACT

The invention provides an electronic file parsing and generation system and method. The system specializes in processing a GDSII file, parsing a library, a structure and an element code therein, and storing parsed data in a relational database. The method also allows the extraction of the parsed data from the database to generate a new electronic file that are fully compatible with other electronic design automation tools. The invention realizes efficient analysis and generation of the GDSII file, can save memory resources, and also improves the speed of data processing, thereby providing greater flexibility and convenience for users.

7 Claims, 6 Drawing Sheets

ELECTRONIC FILE PARSING AND GENERATION SYSTEM AND METHOD

BACKGROUND OF THE INVENTION

This application claims priority for the TW patent application no. 113101217 filed on 11 Jan. 2024, the content of which is incorporated by reference in its entirely.

Field of the Invention

The invention relates to GDSII file generation and parsing technology in electronic design automation tools. In particular, the invention focuses on providing a technology suitable for generating and parsing GDSII files on a portable device.

Description of the Prior Art

In traditional technologies, electronic design automation (EDA) tools are primarily designed to run on traditional desktop and server calculators. These tools need to rely on high computing power and large memory to handle complex electronic design tasks, and these hardware resources were limited on portable devices in the past. Therefore, EDA tools cannot run effectively on portable devices such as smart phones and tablets.

In addition, traditional EDA tools are mostly developed for operating systems such as Windows or Linux, and are not designed for portable operating systems such as iOS or Android. This difference between operating systems leads to problems related to compatibility for EDA tools running directly on portable devices. Meanwhile, the user interface and interaction mode of EDA tools need to undergo major adjustments to adapt to portable devices based on touch operations.

In addition to limitations in terms of hardware and software, data processing is also a challenge. Since portable devices have limited storage space and data processing capabilities compared to traditional computers, large-scale circuit design and data access are difficult to implement in portable devices. Further, data transfer and synchronization also becomes more difficult due to limitations in network connection.

Based on the above factors, traditional EDA tools cannot meet the needs for efficient electronic design on portable devices. With the improvement of hardware performance and the evolution of software environments of portable devices, an EDA tool suitable for portable devices should be developed in the art, especially for the generation and parse of GDSII files, which has become an important need and challenge for those skilled in the art.

SUMMARY OF THE INVENTION

An objective of the invention is to provide an electronic file parsing and generation system and method. By developing a GDSII file generation and parsing program suitable for portable devices, and using a relational database approach to optimize the use of scratchpad memory, the gap in the market for such tools is filled.

The invention provides an electronic file parsing system. The electronic file parsing system is an application installed in an electronic device, and the electronic device executes the application to parse the electronic file. The electronic file parsing system includes a library parsing module, a structure parsing module and an element classification module. The library parsing module is configured to convert a file head code, a library head code, a library name code, a format type code, a unit code and a library tail code in the electronic file into a file head data, a library head data, a library name data, a format type data, a unit data and a library tail data respectively, and store the file head data, the library head data, the library name data, the format type data, the unit data and the library tail data as a library database in a relational database type. The structure parsing module is configured to convert a structure head code, a structure name code and a structure tail code associated with a structure code in the electronic file into a structure head data, a structure name data and a structure tail data, store the structure head data, the structure name data and the structure tail data as a structure database in the relational database type, and associate the structure database with the library database. The element classification module is configured to convert a plurality of element codes associated with the structure code and a plurality of attribute codes corresponding to each of the element codes in the electronic file into a plurality of element data and a plurality of attribute data corresponding to each of the element data respectively, store the element data as an element classification database in the relational database type, and associate the element classification database with the structure database.

The electronic file parsing system further includes a library update module, a structure update module and an element classification editing module. The library update module is configured to correspondingly update editing contents related to the file head data, the library head data, the library name data, the format type data, the unit data and the library tail data during an editing process in the library database. The structure update module is configured to correspondingly update editing contents related to the structure head data, the structure name data and the structure tail data during the editing process in the structure database. The element classification editing module is configured to correspondingly update editing contents related to the element data and the plurality of attribute data corresponding to each of the elements during the editing process in the element classification database.

The library parsing module is configured to convert a reference library code, a font definition file name code, an attribute definition table code and a generation number code in the electronic file into a reference library data, a font definition file name data, an attribute definition table data and a generation number data respectively, and store the reference library data, the font definition file name data, the attribute definition table data and the generation number data in the library database in the relational database type.

The format type code further includes a format category code, a mask layer list code and a mask layer list tail code; the library parsing module is configured to convert the format category code, the mask layer list code and the mask layer list tail code into a format category data, a mask layer list data and a mask layer list tail data respectively, and store the format category data, the mask layer list data and the mask layer list tail data are stored in the library database in the relational database type.

The element classification module is further configured to parse the electronic file for the plurality of attribute codes of each of the element codes; the plurality of attribute data include a type, a template data, an external data, a plex number, a reflection, an absolute angle, an absolute magnification, a strans, a magnification, an angle, a path type, a width, a reference structure name, a column number, a row number and a string.

The electronic file parsing system further includes a graphical user interface module, wherein the graphical user interface module is configured to provide a display for editing a data in the library database, the structure database and the element classification database through an instruction, and allow a user to view or edit the data through a graphical user interface.

The invention further provides an electronic file parsing method, which is executed in the above electronic file parsing system, and the electronic file parsing system is installed in a portable device, wherein the method includes steps of:

receiving a request of a user to read an electronic file;

identifying a file head code, a library head code, a library name code, a format type code, a unit code and a library tail code in the electronic file, converting the same into a file head data, a library head data, a library name data, a format type data, a unit data and a library tail data respectively, and storing the data as the library database in the relational database type;

identifying a structure head code, a structure name code and a structure tail code associated with a structure code in the electronic file, converting the same into a structure head data, a structure name data and a structure tail data respectively, and storing the data as the structure database in the relational database type; and identifying a plurality of element codes associated with the structure code and a plurality of attribute codes corresponding to each of the element codes in the electronic file, converting the same into a plurality of element data and a plurality of attribute data corresponding to each of the element data respectively, and storing the element data as the element classification database in the relational database type.

The invention further provides an electronic file generation system, which is applied to generate a new electronic file from the library database, the structure database and the element classification database in the above electronic file parsing system, and the electronic file generation system includes a library generation module, a structure generation module and at least one element classification generation module. The library generation module is configured to generate the file head data, the library head data, the library name data, the format type data, the unit data and the library tail data in the library database as the file head code, the library head code, the library name code, the format type code, the unit code and the library tail code in the new electronic file. The structure generation module is configured to generate the structure head data, the structure name data and the structure tail data associated with a structure data in the structure database as the structure head code, the structure name code and the structure tail code in the new electronic file. The at least one element classification generation module is configured to generate the plurality of element data associated with the structure data and the plurality of attribute data corresponding to each of the element data in the element classification database as the plurality of element codes and the plurality of attribute codes corresponding to each of the element codes in the new electronic file.

The library name code, the format type code and the unit code in the new electronic file are between the library head code and the structure head code, and the plurality of attribute codes and the plurality of structure codes are associated between the structure head code and the structure tail code.

The library database further includes a reference library data, a font definition file name data, an attribute definition table data and a generation number data for the library generation module to generate the reference library code, the font definition file name code, the attribute definition table code and the generation number code in the new electronic file.

The library database further includes a format category data, a mask layer list data and a mask layer list tail data for the library generation module to generate the format category code, the mask layer list code and the mask layer list tail code in the new electronic file.

The at least one element classification generation module is further configured to generate the new electronic file for at least one of the plurality of attribute data corresponding to each of the element data; the plurality of attribute data include an element type, a template data, an external data, a plex number, a reflection, an absolute angle, an absolute magnification, a strans, a magnification, an angle, a path type, a width, a reference structure name, a column number, a row number and a string.

The electronic file generation system further includes a graphical user interface module, wherein the graphical user interface module is configured to provide a display for editing a data in the library database, the structure database and the element classification database through an instruction, and allow a user to perform an operation of generating the electronic file through a graphical user interface.

The invention further provides an electronic file generation method, which is executed in the above electronic file generation system, and the electronic file generation system is installed in a portable device, wherein the method includes steps of:

receiving a request of a user to generate a new electronic file;

exporting data of the library database, the structure database and the element classification database, wherein the file head data, the library head data, the library name data, the format type data, the unit data and the library tail data in the library database are generated as the file head code, the library head code, the library name code, the format type code, the unit code and the library tail code in the new electronic file, and a first code of hexadecimal notation is generated, wherein the structure head data, the structure name data and the structure tail data associated with a structure data in the structure database are generated as the structure head code, the structure name code and the structure tail code in the new electronic file, and a second code of hexadecimal notation is generated, and wherein the plurality of element data associated with the structure data and the plurality of attribute data corresponding to each of the element data in the element classification database are generated as the plurality of element codes and the plurality of attribute codes corresponding to each of the element codes in the new electronic file, and a third code of hexadecimal notation is generated; and generating the new electronic file having the first code, the second code and the third code.

A file format of the new electronic file is GDSII.

In summary, the invention may include the following beneficial effects:

In terms of electronic file parsing, the invention provides an integrated relational database, which stores each code in the electronic file as a library database, the structure database and the element classification database respectively based on the category, the length, the attribute and other characteristics thereof. This configuration may significantly shorten the time required for electronic file parsing, replacing the need to repeatedly parse a large number of array record contents in the electronic file for each code in the past to obtain the corresponding data. Therefore, during the process of parsing the GDSII file by the invention, too much temporary memory space on the portable device may be avoided from occupying.

In terms of electronic file generation, the invention enables the user to obtain the associations between libraries, structures and elements one by one through the relational database, may convert respective related attributes into a hexadecimal array through hexadecimal notation, and generates the electronic file that may be accepted and opened by various electronic file tools (such as EDA tools), so as to further achieve the purpose of sharing results with other users of electronic file tools.

Figure 1:
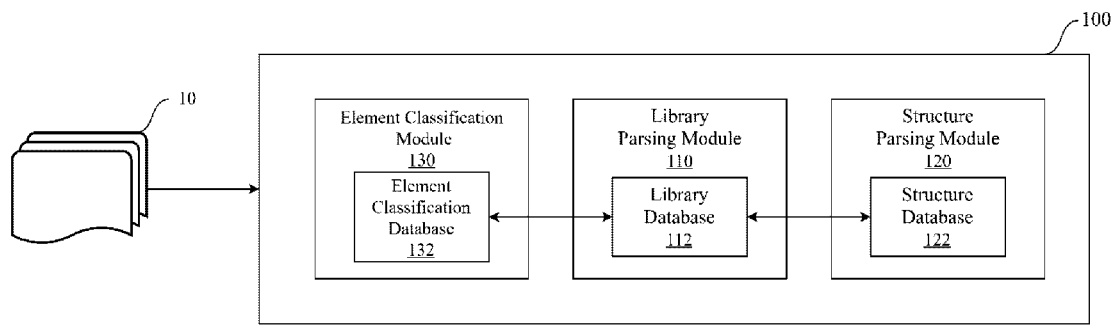
FIG. 1 is a first block diagram of an electronic file parsing system according to an embodiment provided by the invention.

Description of reference numerals: 10—electronic file; 100—electronic file parsing system; 110—library parsing module; 112—library database; 120—structure parsing module; 122—structure database; 130—element classification module; 132—element classification database; 140—library update module; 150—structure update module; 160—element classification editing module; 170—graphical user interface module; 50—new electronic file; 500—electronic file generation system; 510—library generation module; 520—structure generation module; 530—element classification generation module; 540—graphical user interface module.

DESCRIPTION OF THE PREFERRED EMBODIMENTS

Embodiments of the invention will be further explained with the help of the related drawings below. Wherever possible, in the drawings and the description, the same reference numbers refer to the same or similar components. It should be understood that the elements not particularly shown in the drawings or described in the specification have forms known to those skilled in the art. Those skilled in the art can make various changes and modifications based on the content of the invention.

With reference to FIG. 1, FIG. 1 is a first block diagram of an electronic file parsing system according to an embodiment provided by the invention.

According to an embodiment, an electronic file parsing system 100 is provided. The electronic file parsing system 100 is an application installed in an electronic device, and the electronic device executes the application to parse the electronic file 10. The electronic file parsing system 100 includes a library parsing module 110, a structure parsing module 120 and an element classification module 130. The library parsing module 110 is configured to convert a file head code, a library head code, a library name code, a format type code, a unit code and a library tail code in the electronic file 10 into a file head data, a library head data, a library name data, a format type data, a unit data and a library tail data respectively, and store the file head data, the library head data, the library name data, the format type data, the unit data and the library tail data as a library database 112 in a relational database type. The structure parsing module 120 is configured to convert a structure head code, a structure name code and a structure tail code associated with a structure code in the electronic file 10 into a structure head data, a structure name data and a structure tail data, store the structure head data, the structure name data and the structure tail data as a structure database 122 in the relational database type, and associate the structure database with the library database 112. The element classification module 130 is configured to convert a plurality of element codes associated with the structure code and a plurality of attribute codes corresponding to each of the element codes in the electronic file 10 into a plurality of element data and a plurality of attribute data corresponding to each of the element data respectively, store the element data as an element classification database 132 in the relational database type, and associate the element classification database with the structure database 112.

The electronic device is a computer device with data processing capabilities, and is particularly a portable device, such as a smart phone, a smart tablet or a notebook computer.

Figure 2:
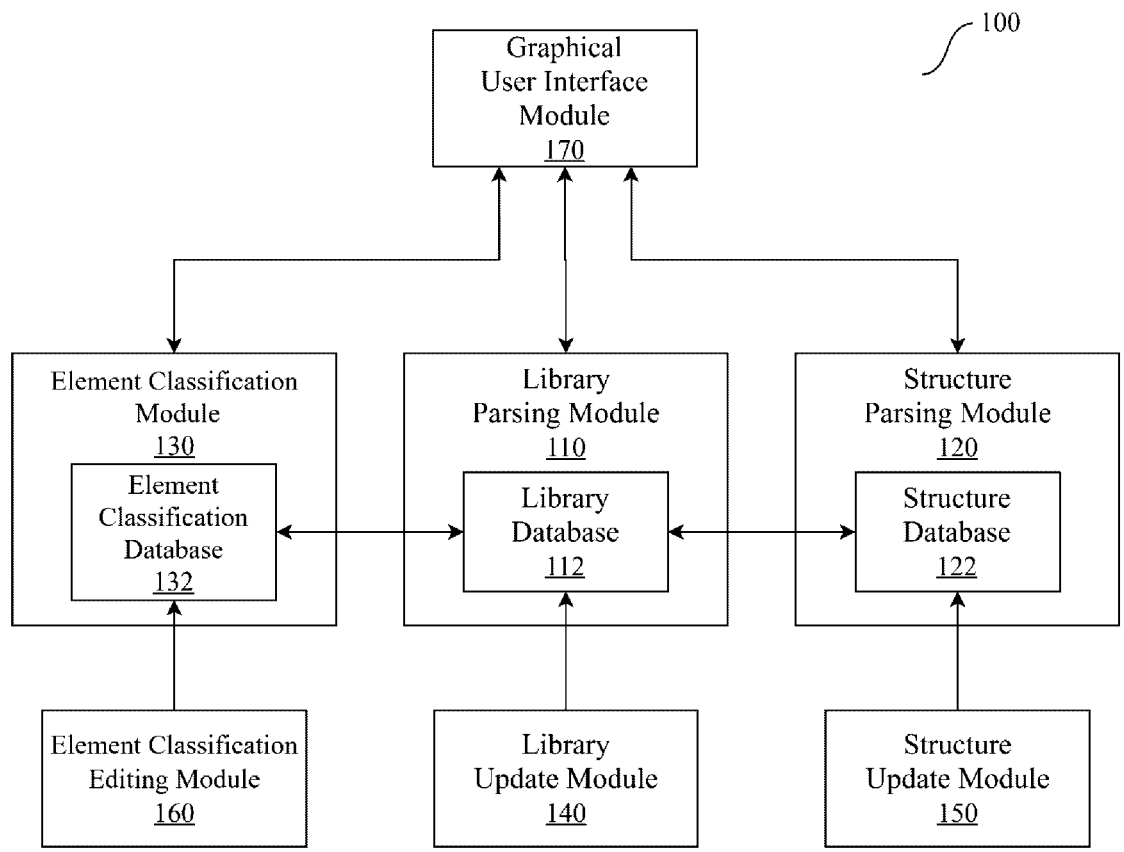
FIG. 2 is a second block diagram of the electronic file parsing system according to an embodiment provided by the invention.

With reference to FIG. 2, FIG. 2 is a second block diagram of the electronic file parsing system according to an embodiment provided by the invention.

According to another embodiment, the electronic file parsing system 100 further includes a library update module 140, a structure update module 150 and an element classification editing module 160. The library editing module 140 is configured to correspondingly update editing contents related to the file head data, the library head data, the library name data, the format type data, the unit data and the library tail data during an editing process in the library database 112. The structure update module 150 is configured to correspondingly update editing contents related to the structure head data, the structure name data and the structure tail data during the editing process in the structure database 122. The element classification editing module 160 is configured to correspondingly update editing contents related to the element data and the plurality of attribute data corresponding to each of the elements during the editing process in the element classification database 132.

According to still another embodiment, the electronic file parsing system 100 further includes a graphical user interface module 170, wherein the graphical user interface module 170 is configured to provide a display for editing a data in the library database 112, the structure database 122 and the element classification database 132 through an instruction, and allow a user to view or edit the data through a graphical user interface. The graphical user interface module 170 also provides multi-touch support, allowing the user to interactively operate displayed elements through gestures such as zooming, rotating, and moving.

The instructions may be, for example, SQL (Structured Query Language) instructions. In the electronic file parsing system, the SQL instructions will be used to retrieve specific data from various databases (such as the library database 112, the structure database 122, and the element classification database 132) in order to view or edit the data in the database.

Figure 3:
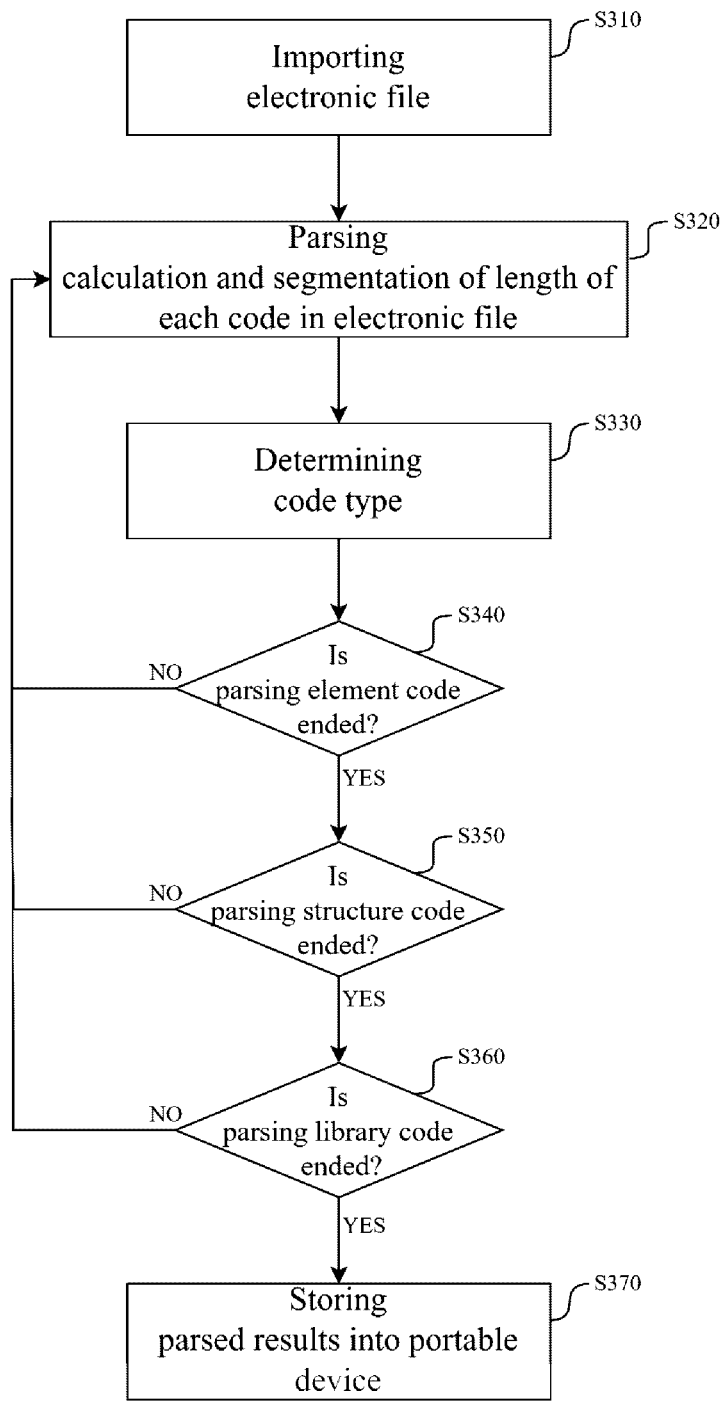
FIG. 3 is a flow chart of the electronic file parsing according to an embodiment provided by the invention.
Figure 4:
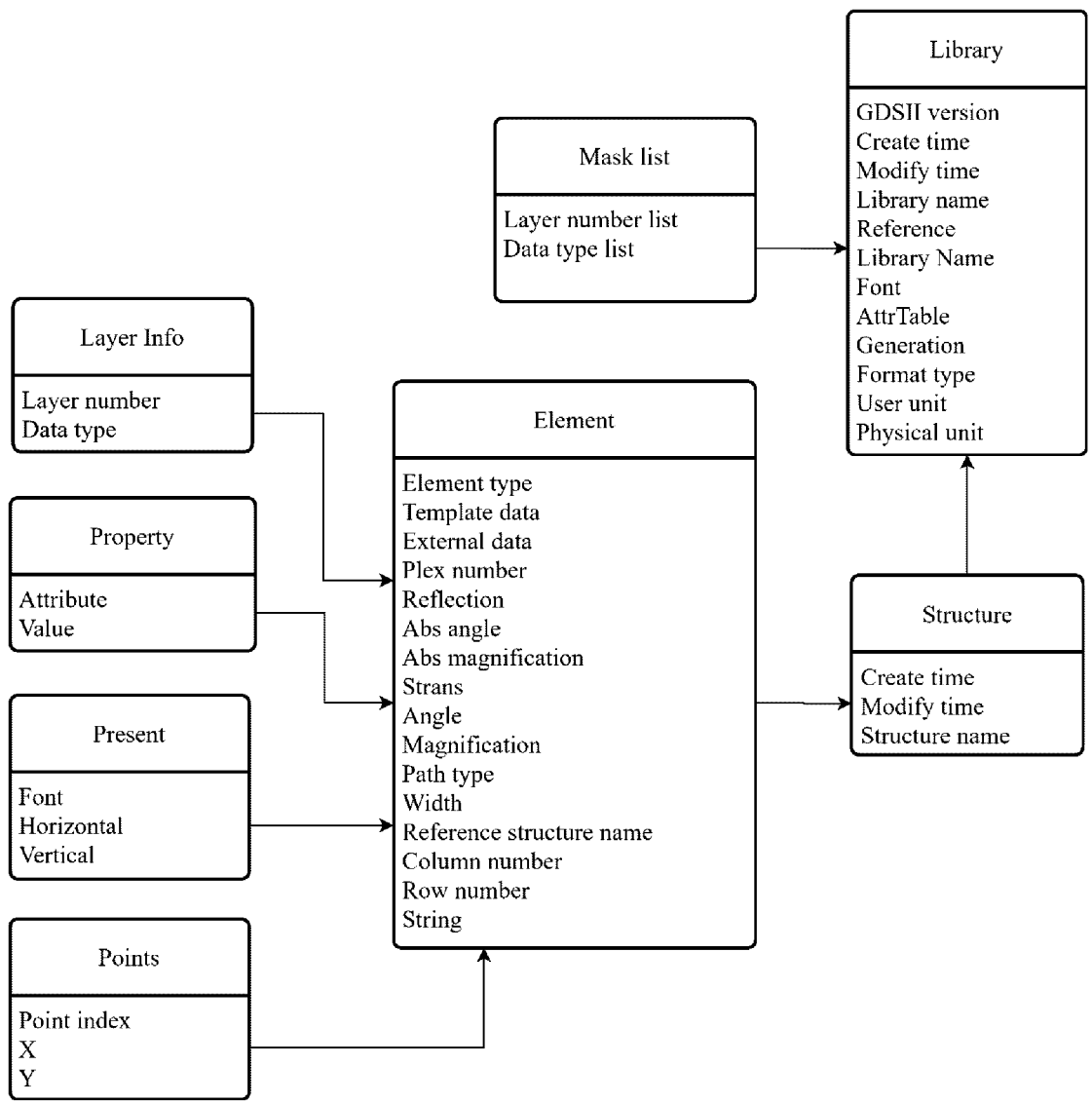
FIG. 4 is a data structure of an electronic file according to an embodiment provided by the invention.

With reference to FIGS. 3 and 4, FIG. 3 is a flow chart of the electronic file parsing according to an embodiment provided by the invention, and FIG. 4 is a database structure of an electronic file according to an embodiment provided by the invention.

According to another embodiment, FIG. 3 illustrates a flow chart of implementing the electronic file parsing, which includes the steps S310 to S370, and detailed descriptions are as follows.

Step S310, an electronic file is imported. A file format of the electronic file 10 is GDSII.

Step S320, calculation and segmentation of a length of each code in the electronic file are parsed.

Step S330, a code type is determined. Here, with reference to FIG. 4, the step S330 will parse the code type of the electronic file, and the electronic file used in FIG. 4 is GDSII. Therefore, according to the characteristics of GDSII, it can be parsed into hexadecimal codes of elements, structures and library.

Step S340, whether parsing the element code is ended is determined. If yes, a step S350 is continued; if no, the step S320 is continued. The element code is shown in FIG. 4, which, for example, may be an element type, a template data, an external data, a plex number, a reflection, an Abs angle, an Abs magnification, a Strans, an Angle, a magnification, a path type, a width, a reference structure name, a column number, a row number, and a string.

Step S350, whether parsing the structure code is ended is determined. If yes, a step S360 is continued; if no, the step S320 is continued. The structure code is shown in FIG. 4, which, for example, may be a create time, a modify time, and a structure name.

Step S360, whether parsing the library code is ended is determined. If yes, a step S370 is continued; if no, the step S320 is continued. The library code is shown in FIG. 4, which, for example, may be a GDSII version, a create time, a modify time, a library name, a reference library name, a font, an attribute table, a generation, a format type, a user unit, and a physical unit.

Step S370, parsed results are stored in a portable device.

According to still another embodiment, the element codes are contents listed in FIG. 4, which further consists of a layer info, a property, a present, and a points.

Figure 5:
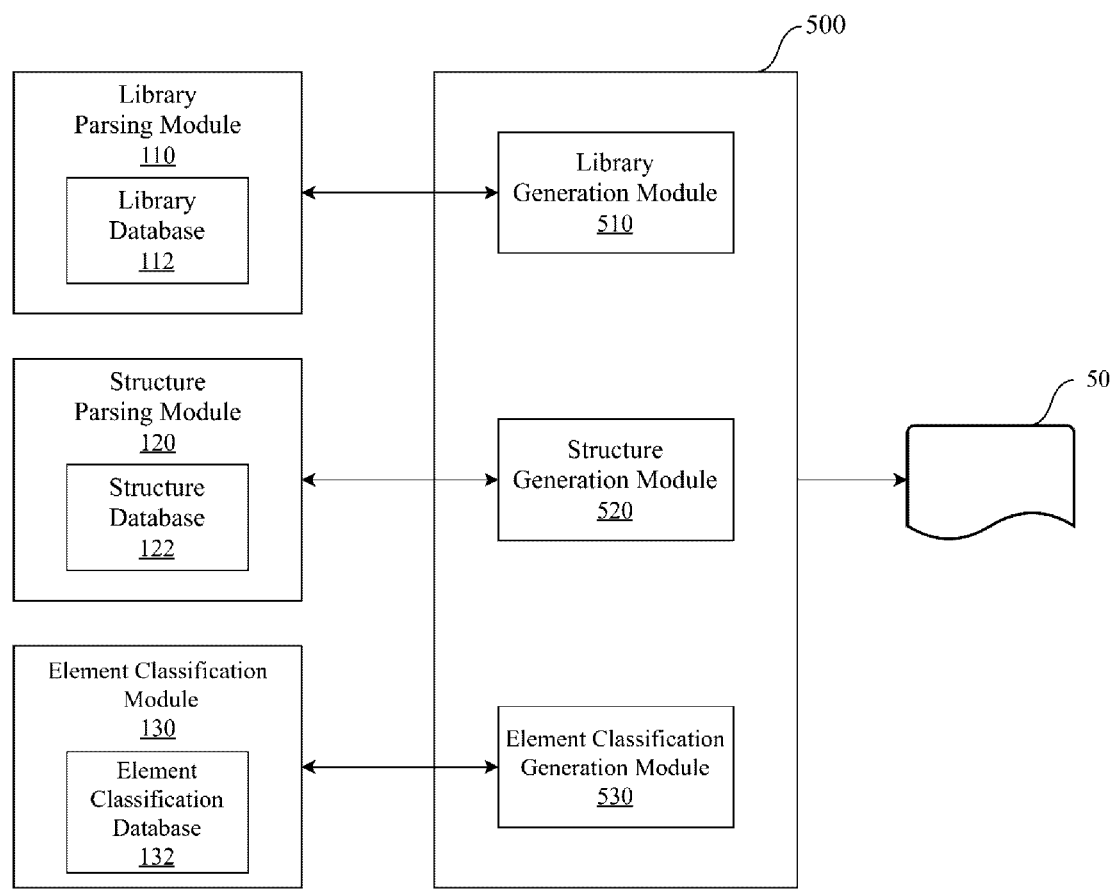
FIG. 5 is a first block diagram of an electronic file generation system according to an embodiment provided by the invention.

With reference to FIG. 5, FIG. 5 is a first block diagram of an electronic file generation system according to an embodiment provided by the invention.

According to another embodiment, an electronic file generation system 500 is provided, which is applied to generate a new electronic file from the library database 112, the structure database 122 and the element classification database 132 in the above electronic file parsing system 100 of FIG. 1, and the electronic file generation system 500 includes a library generation module 510, a structure generation module 520 and at least one element classification generation module 530. The library generation module 510 is configured to generate the file head data, the library head data, the library name data, the format type data, the unit data and the library tail data in the library database 112 as the file head code, the library head code, the library name code, the format type code, the unit code and the library tail code in the new electronic file. The structure generation module 520 is configured to generate the structure head data, the structure name data and the structure tail data associated with a structure data in the structure database 122 as the structure head code, the structure name code and the structure tail code in the new electronic file. The at least one element classification generation module 530 is configured to generate the plurality of element data associated with the structure data and the plurality of attribute data corresponding to each of the element data in the element classification database 132 as the plurality of element codes and the plurality of attribute codes corresponding to each of the element codes in the new electronic file.

The electronic device is a computer device with data processing capabilities, and is particularly a portable device, such as a smart phone, a smart tablet or a notebook computer.

Figure 6:
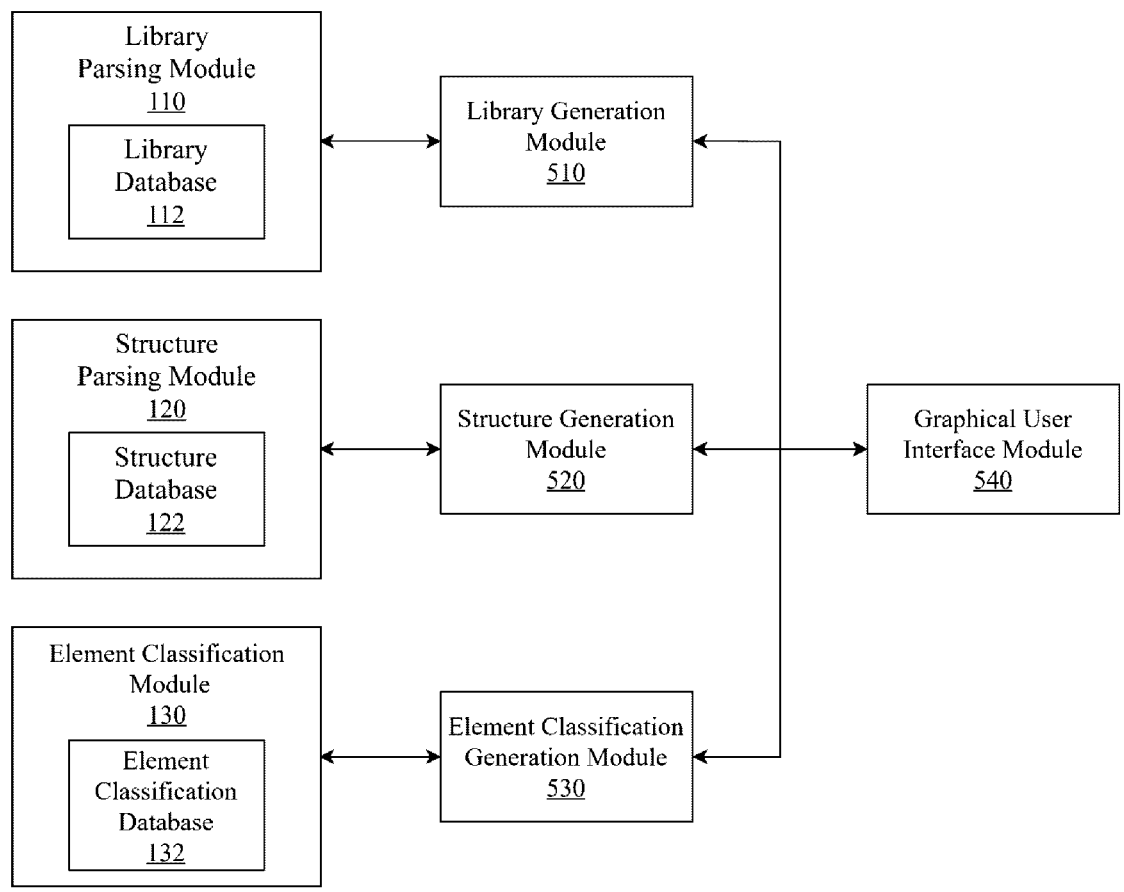
FIG. 6 is a second block diagram of an electronic file generation system according to an embodiment provided by the invention.

With reference to FIG. 6, FIG. 6 is a second block diagram of an electronic file generation system according to an embodiment provided by the invention.

According to another embodiment, the electronic file generation system 500 further includes a graphical user interface module 540, wherein the graphical user interface module 540 is configured to provide a display for editing a data in the library database 112, the structure database 122 and the element classification database 132 through an instruction, and allow a user to perform an operation of generating the electronic file through a graphical user interface. The graphical user interface module 540 also provides multi-touch support, allowing the user to interactively operate displayed elements through gestures such as zooming, rotating, and moving.

The instructions may be, for example, SQL instructions. In the electronic file generation system, the SQL instructions will be used to retrieve specific data from various databases (such as the library database 112, the structure database 122 and the element classification database 132), so as to use these data in the process of generating the electronic file.

Figure 7:
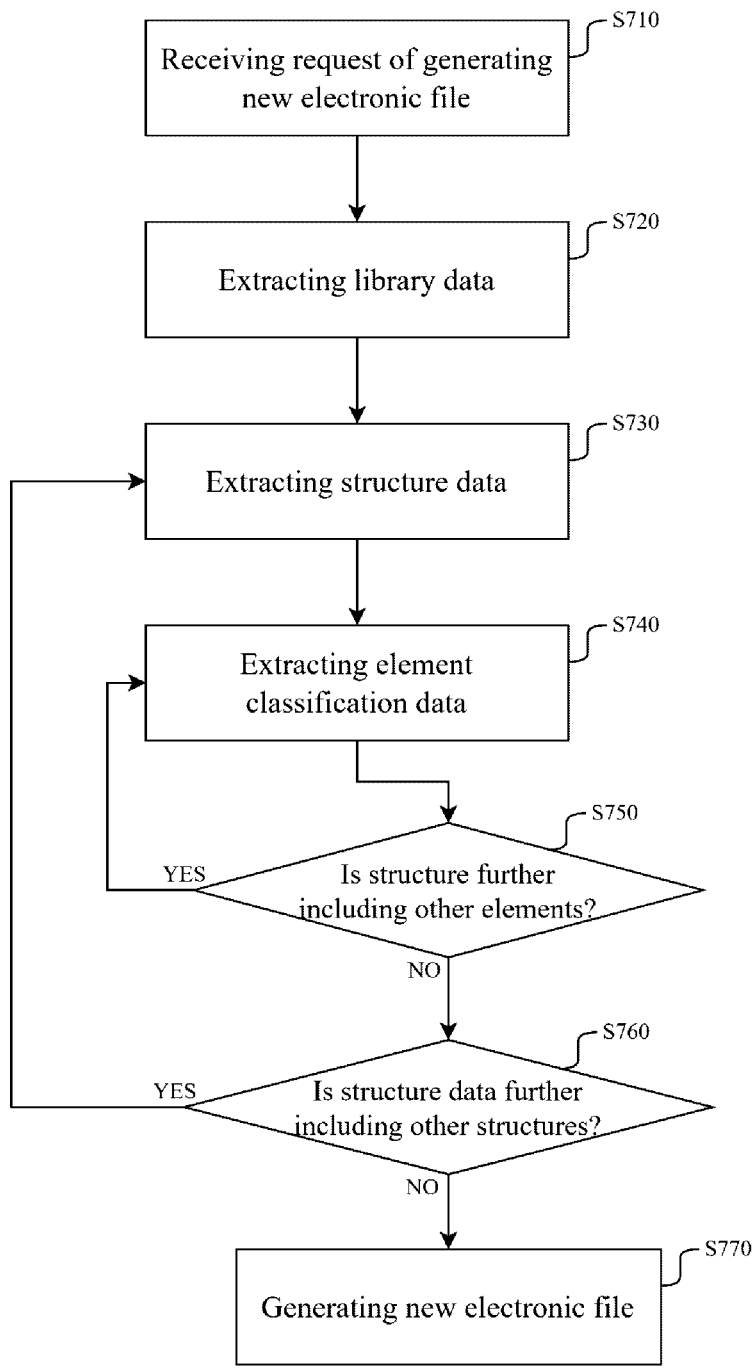
FIG. 7 is a flow chart of the electronic file generation according to an embodiment provided by the invention.

With reference to FIG. 7, FIG. 7 is a flow chart of the electronic file generation according to an embodiment provided by the invention.

According to another embodiment, FIG. 7 illustrates a flow chart of implementing the electronic file generation, which includes the steps S710 to S770, and detailed descriptions are as follows.

Step S710, a request to generate a new electronic file is received.

Step S720, the library data are extracted, and the library data may be, for example, the data of the library recorded in FIG. 4.

Step S730, the structure data are extracted, and the structure data may be, for example, the data of the structure recorded in FIG. 4.

Step S740, the element classification data are extracted, and the element data may be, for example, the data of the element recorded in FIG. 4 and some subordinate data of the layer info, the property, the present and the points.

Step S750, whether the structure further includes other elements is determined. If yes, a step S760 is continued; if no, the step S740 is continued.

Step S760, whether the structure data further include other structures is determined. If yes, a step S770 is continued; if no, the step S730 is continued.

Step S770, a new electronic file is generated.

The specific code required to generate the GDSII file has been recorded in the previous embodiment of the electronic file parsing and will not be described again here.

According to another embodiment, the electronic file generation system further includes an integrated verification module (not shown), and the integrated verification module is configured to verify data consistency and integrity among the library database, the structure database and the element classification database before generating the new electronic file, so as to prevent data loss or errors during the generation process.

Further, according to the electronic file format definition of the GDSII format, the electronic file format consists of variable-length records. The minimum record length is four bytes. The record length may be unlimited. The first four bytes of each electronic file are the 'head'. The first two bytes of the 'head' contain a 'count' of the total record length in octets. The 'count' records where one record ends and another begins. The next record begins immediately after the last byte included in the 'count'. The third and fourth bytes of the 'head' describe a record type contained in the record. These four bytes are expressed in hexadecimal notation. The record from the fifth byte to the last byte is 'data', representing the data value itself, expressed in hexadecimal notation. The 'data' may be a two-byte signed integer, a four-byte signed integer, a floating point number, an array, etc., all based on the record type. Therefore, the electronic file parsing system of the invention may parse the electronic file according to the aforementioned definition and convert them into databases in the relational database type, and may further convert the data of each database in the relational database type back to the electronic file in GDSII format according to the aforementioned format definition.

According to another embodiment, the electronic file generation system further includes a formatting module (not shown), which is configured to format the new electronic file generated into a format that allows them to be read by different types of EDA tools, and the new electronic file is formatted as GDSII.

The above description is only to illustrate the preferred implementation mode of the invention, and is not intended to limit the scope of implementation. All simple replacements and equivalent changes made according to the claims and the contents of the description of the invention and the content of the patent specification all belong to the scope of the invention.

What is claimed is:

1. An electronic file parsing and generation system, the electronic file parsing and generation system being an application program installed in an electronic device, wherein the electronic file parsing and generation system comprises:
   a library parsing module, configured to convert a file head code, a library head code, a library name code, a format type code, a unit code and a library tail code in the electronic file into a file head data, a library head data, a library name data, a format type data, a unit data and a library tail data respectively, and store the file head data, the library head data, the library name data, the format type data, the unit data and the library tail data as a library database in a relational database type;
   a structure parsing module, configured to convert a structure head code, a structure name code and a structure tail code associated with a structure code in the electronic file into a structure head data, a structure name data and a structure tail data, store the structure head data, the structure name data and the structure tail data as a structure database in the relational database type, and associate the structure database with the library database;
   an element classification module, configured to convert a plurality of element codes associated with the structure code and a plurality of attribute codes corresponding to each of the element codes in the electronic file into a plurality of element data and a plurality of attribute data corresponding to each of the element data respectively, store the element data as an element classification database in the relational database type, and associate the element classification database with the structure database;
   a library generation module, configured to generate the file head data, the library head data, the library name data, the format type data, the unit data and the library tail data in the library database as the file head code, the library head code, the library name code, the format type code, the unit code and the library tail code in the new electronic file;
   a structure generation module, configured to generate the structure head data, the structure name data and the structure tail data associated with a structure data in the structure database as the structure head code, the structure name code and the structure tail code in the new electronic file; and
   at least one element classification generation module, configured to generate the plurality of element data associated with the structure data and the plurality of attribute data corresponding to each of the element data in the element classification database as the plurality of element codes and the plurality of attribute codes corresponding to each of the element codes in the new electronic file.

2. The electronic file parsing and generation system according to claim 1, wherein the library name code, the format type code and the unit code in the new electronic file are between the library head code and the structure head code, and the plurality of attribute codes and the plurality of structure codes are associated between the structure head code and the structure tail code.

3. The electronic file parsing and generation system according to claim 1, wherein the library database further comprises a reference library data, a font definition file name data, an attribute definition table data and a generation number data for the library generation module to generate the reference library code, the font definition file name code, the attribute definition table code and the generation number code in the new electronic file.

4. The electronic file parsing and generation system according to claim 1, wherein the library database further comprises a format category data, a mask layer list data and a mask layer list tail data for the library generation module to generate the format category code, the mask layer list code and the mask layer list tail code in the new electronic file.

5. The electronic file parsing and generation system according to claim 1, wherein the at least one element classification generation module is further configured to generate a new electronic file for at least one of the plurality of attribute data corresponding to each of the element data; the plurality of attribute data comprise a type, a template data, an external data, a plex number, a reflection, an absolute angle, an absolute magnification, a strans, a magnification, an angle, a path type, a width, a reference structure name, a column number, a row number and a string.

6. The electronic file parsing and generation system according to claim 1, further comprising a graphical user interface module, wherein the graphical user interface module is configured to provide a display for editing a data in the library database, the structure database and the element classification database through an instruction, and allow a user to perform an operation of generating the electronic file through a graphical user interface.

7. An electronic file parsing and generation method, executed in the electronic file parsing and generation system according to claim 1, the electronic file parsing and generation system being installed in a portable device, wherein the method comprises steps of:

identifying a file head code, a library head code, a library name code, a format type code, a unit code and a library tail code in an electronic file, converting the same into a file head data, a library head data, a library name data, a format type data, a unit data and a library tail data respectively, and storing the data as the library database in the relational database type;

identifying a structure head code, a structure name code and a structure tail code associated with a structure code in the electronic file, converting the same into a structure head data, a structure name data and a structure tail data respectively, and storing the data as the structure database in the relational database type;

identifying a plurality of element codes associated with the structure code and a plurality of attribute codes corresponding to each of the element codes in the electronic file, converting the same into a plurality of element data and a plurality of attribute data corresponding to each of the element data respectively, and storing the element data as the element classification database in the relational database type;

receiving a request of a user to generate a new electronic file;

exporting data of the library database, the structure database and the element classification database, wherein the file head data, the library head data, the library name data, the format type data, the unit data and the library tail data in the library database are generated as the file head code, the library head code, the library name code, the format type code, the unit code and the library tail code in the new electronic file, and a first code of hexadecimal notation is generated, wherein the structure head data, the structure name data and the structure tail data associated with a structure data in the structure database are generated as the structure head code, the structure name code and the structure tail code in the new electronic file, and a second code of hexadecimal notation is generated, and wherein the plurality of element data associated with the structure data and the plurality of attribute data corresponding to each of the element data in the element classification database are generated as the plurality of element codes and the plurality of attribute codes corresponding to each of the element codes in the new electronic file, and a third code of hexadecimal notation is generated; and generating the new electronic file having the first code, the second code and the third code.

* * * * *